United States Patent [19]

Nagel

[11] Patent Number: 4,584,823
[45] Date of Patent: Apr. 29, 1986

[54] IMPROVED METHOD AND APPARATUS FOR BLOW MOLDING IN A SINGLE BLOW MOLDING OPERATION A CONTROLLED DROP BOTTLE

[75] Inventor: Dieter H. Nagel, Elk Grove Village, Ill.

[73] Assignee: Heinz Plastic Mold Co., Elk Grove Village, Ill.

[21] Appl. No.: 710,421

[22] Filed: Mar. 11, 1985

Related U.S. Application Data

[63] Continuation of Ser. No. 501,648, Jun. 6, 1983.

[51] Int. Cl.4 .............................................. B65B 47/10
[52] U.S. Cl. ........................................ 53/453; 53/140;
53/561; 53/574; 264/524; 425/524
[58] Field of Search ................ 53/140, 452, 453, 559,
53/561, 574; 264/524, 525; 425/524, 525, 527, 533

[56] References Cited

U.S. PATENT DOCUMENTS 3,325,860 6/1967 Hansen .................................. 53/561
3,897,670 8/1975 Hansen ............................... 53/561 X Primary Examiner—E. R. Kazenske
Assistant Examiner—Michael D. Folkerts
Attorney, Agent, or Firm—Robert E. Knechtel; Basil E. Demeur

[57] ABSTRACT

A method and apparatus for blow molding in a single form-fill-seal operation a droplet dispenser bottle which delivers fluid in precise, uniform drops rather than the streamlets produced by similar bottles of earlier design. The method and apparatus is such that the desired amount of fluid is dispensed from the bottle regardless of how hard the bottle is squeezed. Depending on the needs of the packager, the method and apparatus can be made to form the orifice to precisely control droplet size and/or weight. The droplet dispenser bottle can be molded in virtually any shape desired to hold up to approximately two ounces of fluid.

13 Claims, 11 Drawing Figures

DIE PARTING LINE

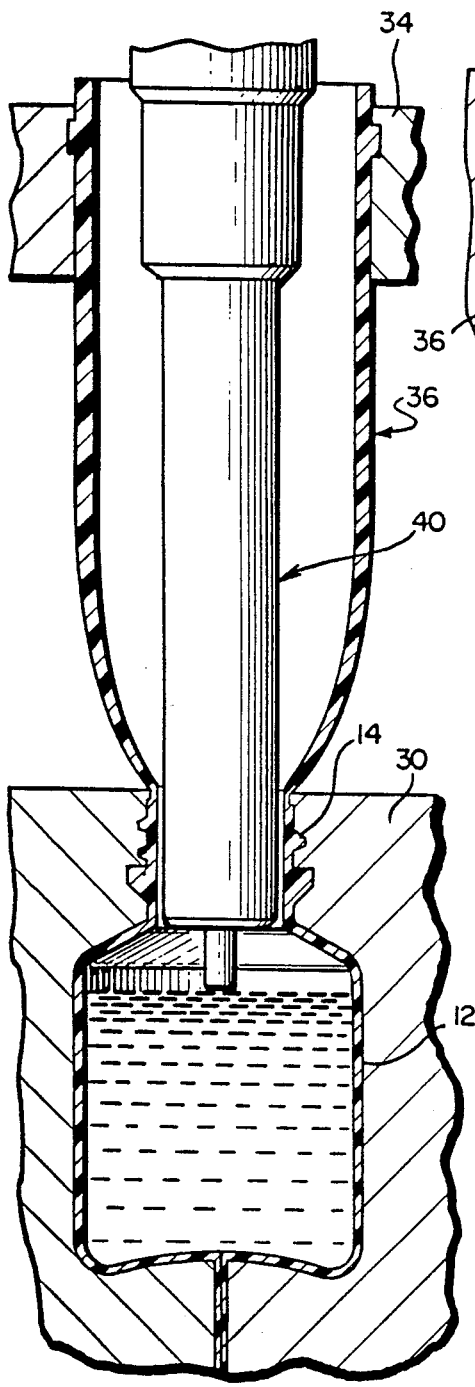
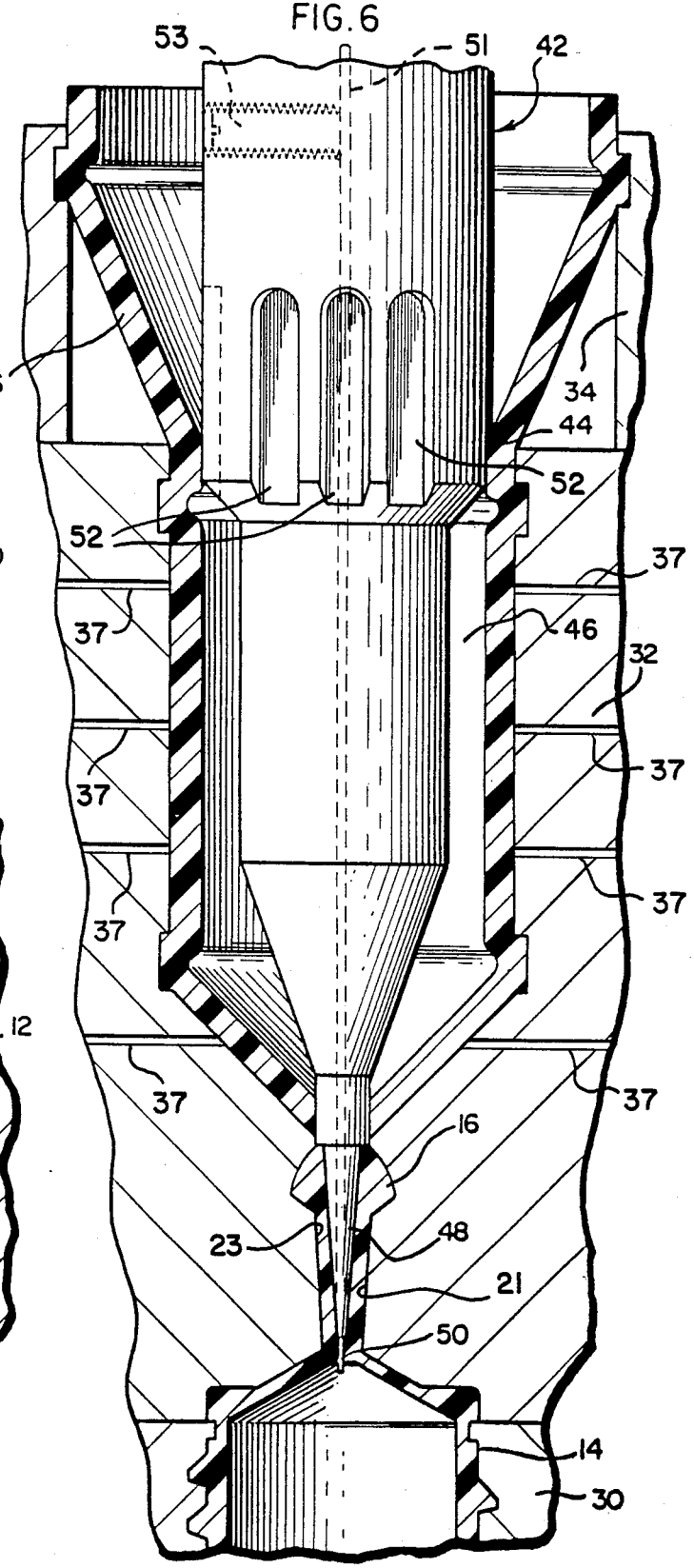

4,584,823

IMPROVED METHOD AND APPARATUS FOR BLOW MOLDING IN A SINGLE BLOW MOLDING OPERATION A CONTROLLED DROP BOTTLE

This is a continuation, of application Ser. No. 501,648, filed June 6, 1983.

BACKGROUND OF THE INVENTION

This invention relates to an Improved Method and Apparatus for Blow Molding a Droplet Dispenser Bottle that insures precise, uniform, one-at-a-time droplet delivery. More particularly, it relates to an improved method and apparatus for molding a droplet dispenser bottle in a single blow molding operation.

Droplet dispenser bottles are well-known in the art. The majority of not all of these bottles, however, are two-piece, injection molded bottles. The manufacturer of these bottles, therefore, require molding apparatus capable of handling inserts which are conveyed to and supported within the apparatus such that the parison can be formed about the insert so that the latter becomes effectively an integral part of the bottle. Such apparatus requires close tolerances, and this requirement results in numerous problems. In addition, while these bottles are intended to dispense fluid in uniform drops, it is found in many cases that the fluid is dispensed in streamlets.

With the method and apparatus of the present invention, the droplet dispenser bottle is blow molded in a single blow molding operation. The droplet dispenser bottle delivers fluid in precise, uniform drops rather than the streamlets producted by similar bottles of earlier design. The desired amount of fluid is dispensed regardless of how hard the bottle is squeezed. Depending on the needs of the packager, the orifice can be varied to precisely control droplet size and/or weight. The droplet dispenser bottle can be molded in virtually any shape desired to hold up to approximately two ounces of fluid.

Accordingly, it is an object of the present invention to provide an improved method and apparatus for blow molding a droplet dispenser bottle that insures precise, uniform, one-at-a-time droplet delivery.

Another object is to provide an improved method and apparatus for forming a droplet dispenser bottle in a single blow molded operation.

For a fuller understanding of the nature and objects of the invention, reference should be had to the following detailed description taken in connection with the accompanying drawings in which:

FIG. 5 is a partial sectional view generally illustrating the manner in which the container portion and the neck portion of the droplet dispenser bottle is formed and filled;

FIG. 6 is a partial sectional view generally illustrating the manner in which the tip portion of the droplet dispenser bottle is formed.

Similar reference characters refer to similar parts throughout the several views of the drawing.

DESCRIPTION OF A PREFERRED EMBODIMENT

Figure 1:
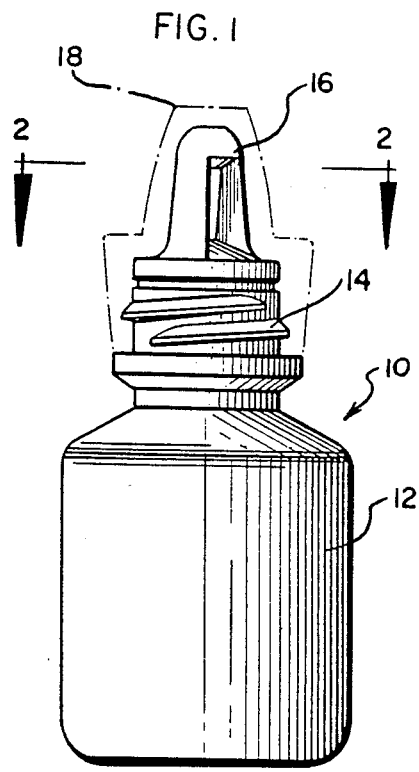
FIG. 1 is a side plan view of a droplet dispenser bottle exemplary of the invention.

Referring now to the drawings, in FIG. 1 there is illustrated a droplet dispenser bottle 10 which is blow molded in accordance with the method and with the apparatus of the present invention. The dispenser bottle 10 has a fluid container portion 12, a threaded neck portion 14 and a tip portion 16. The bottle 10 is blow molded in a single blow molded operation, as more fully described below, using a plastic resin which offers good impact strength and squeezability. While various plastic resins can be used, so long as the resin mold shrinkage rate is consistent, a preferred plastic resin is Chemplex 3404. A cap 18 is threadedly affixed to the bottle 10, and is proportioned with the neck and tip portions 14, 16 to seal the bottle 10. The bottle 10 delivers fluid in precise, uniform drops rather than streamlets as produced by similar bottles presently available on the market for dispensing drops. Furthermore, the orifice can be varied to precisely control droplet size and/or weight, all as more fully described below.

Figure 3:
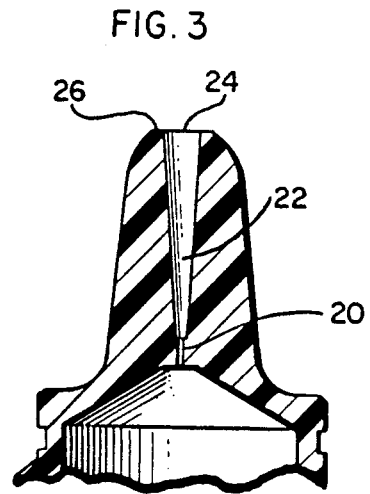
FIG. 3 is a partial, enlarged sectional view taken along lines 3—3 of FIG. 2.
Figure 4:
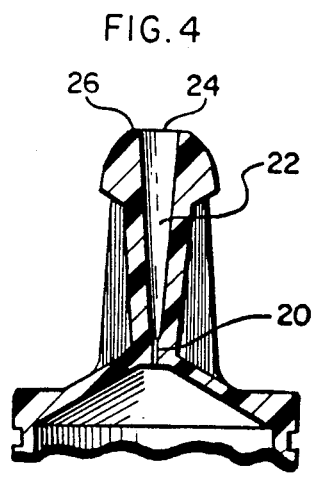
FIG. 4 is a partial, enlarged sectional view taken along lines 4—4 of FIG. 2.
Figure 7:
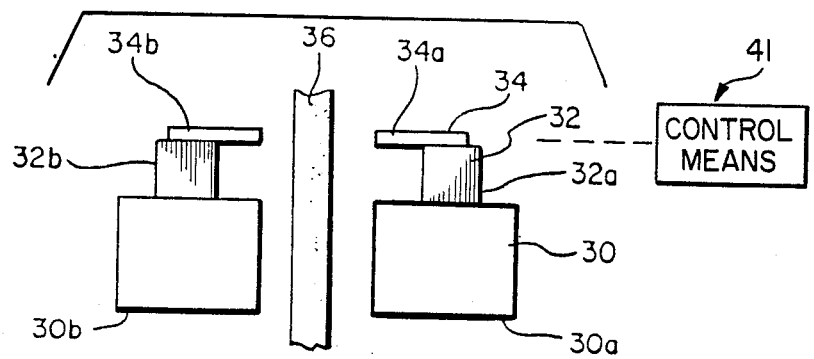
FIGS. 7-11 are partial sectional views generally illustrating the method of forming and filling the droplet dispenser bottle.

The tip portion 14, as can be best seen in FIGS. 3 and 4, has formed therein a first orifice 20 which is cylindrical-shaped and a second orifice 22 which is cone-shaped. The first orifice 20 is in open communication with the fluid container portion 12 and the second orifice 22, and is proportioned to control the dispensing speed of fluid from the fluid container portion 12 into the second orifice 22. The second orifice 22 is proportioned to form a drop of fluid, and the diameter of the base of the cone which forms a dispensing orifice 24 in conjunction with the land 26 about it, determines the size and/or weight of the drop of fluid dispensed from the bottle 10.

More particularly, the larger the diameter of the first orifice 20, the faster fluid will be dispensed from the fluid container portion 12 through the first orifice 20 into the second orifice 22. Bearing in mind that the fluid container portion 12 is squeezed to dispense fluid from the bottle 10, the first orifice 20 is proportioned first of all to prevent a stream of fluid from being shot out of the bottle 10. Next, the diameter of the first orifice 20 is proportioned, depending upon the length and diameter of the second orifice 22, such that fluid flowing into the second orifice 22 wets by surface tension or adhesion the walls of the second orifice 22 as it flows into and through it, so as to start the formation of a drop of fluid. The length and diameter of the second orifice 22 is primarily determined by the diameter of the dispensing orifice 24 which in conjunction with the land 26 about it, determines or controls the size and/or weight of the drop of fluid dispensed from the bottle 10. In particular, the smaller the size of the dispensing orifice 24, the less the amount of fluid that flows out of it. The land 26 functions in conjunction with the size of the dispensing orifice 24, again by the fluid wetting it by surface tension or adhesion, to form a drop of fluid. Accordingly, if a smaller diameter dispensing orifice 24 is used and the diameter or area of the land 26 around it also is small, a small drop of fluid will form. Larger drops are formed by increasing the diameter of the dispensing orifice 24 and the diameter or area of the land 26 which surrounds it. Therefore, by proportioning the diameter of the dispensing orifice 24 and the diameter or area of the land 26, the size and/or weight of the drop of fluid dispensed from the bottle can be precisely controlled.

As to the length of the second orifice 22, being cone-shaped which is essential to the function of the bottle 10 in providing controlled drops of fluid, its length is again proportioned so that fluid flowing into it will wet the walls of the orifice as the fluid flows through it to start the formation of a drop. In other words, as the fluid enters the second orifice 22, it should immediately contact and wet its walls, and should gradually start the formation of the drop. If the length of the second orifice is too short, fat cone-shaped orifice results and the fluid fills and flows through the orifice too quickly to properly form a drop of fluid in a precise, controlled fashion.

With respect to the tip portion 16, an experimental droplet dispenser bottle 10 having a first orifice 20 with a diameter of 0.004 inches, a second orifice 22 with a dispensing orifice 24 of 0.030 inches and with a land 26 0.005 inches in width was molded and functioned to provide a uniform, one-at-a-time drop of fluid, regardless of how hard the bottle 10 was squeezed. As indicated above, the diameter of the first orifice 20 and the dispensing orifice 24 both can be varied within a reasonable range from the above recited diameters, as can be the size of the land 26.

As to the fluid container portion 12 and the neck portion 14, these can be sized as desired and molded into virtually any shape desired to hold up to approximately two ounces of fluid. As indicated above, the fluid is dispensed from the bottle 10 by squeezing the fluid container portion 12. The latter therefore should be of sufficient strength and squeezability to perform the desired function.

The droplet dispenser bottle 10 is blow molded in a single blow molded operation. In this respect, the apparatus for molding the bottle 10 can be generally like that disclosed in U.S. Pat. No. 3,325,860, to Gerhard Hansen. Such apparatus includes generally, an extruder, a two-piece mold, a holding jaw, a head jaw, a cutting apparatus, and a composite filling and blowing tube. For a full and detailed description of the apparatus in this operation, reference can be made to the above-mentioned U.S. Pat. No. 3,325,860. Generally, however, the operation is as follows: A parison in the form of a hollow tube is extruded by the extruder, between the mold halves of the two-piece mold. When the parison is of the required length, the mold halves are closed. The lower end of the parison is pinched closed by the mold, and its upper end is positioned and held by the holding jaw, through the application of vacuum applied thereto, and is separated by the cutting apparatus.

To fill the container, the mandrel of the composite filling and blowing tube moves into the conical neck portion of the parison, and the hot plastic parison is inflated by a burst of compressed air and pressed against the walls of the mold. At the same time, a precise metered quantity of the product being bottled fills the container by a filling channel in the mandrel by a precise metering machine.

The mandrel is raised, and the head jaw is closed to form and seal the upper container head. Thereafter the mold, the head jaw and the holding jaw all open, and the container leaves the apparatus via a container drop-out chute.

The apparatus for molding the bottle 10 is generally illustrated in FIGS. 7–11. In this instance, the apparatus of the above-mentioned U.S. Pat. No. 3,325,860 is modified such that the mold 30 including mold halves 30A, 30B, for forming the fluid container portion 12 and the threaded neck portion 14, the head jaw 32 including head jaw halves 32A, 32B for forming the tip portion 16; and the holding jaw 34 including jaw halves 34A, 34B, first move (into and out of the drawing) about the parison 36, and the mold halves 30A, 30B are closed. The lower end of the parison 36 is pinched closed by the mold 30, and its upper end is positioned and held by the holding jaw 34, and is separated by a cutting apparatus (not shown). Thereafter, the mold 30 and its associated parts move (out of the drawing) beneath a composite head 38 which carries a filling mandrel 40 and a tip forming core 42, and which is adapted to travel back and forth (right to left in the drawing) to first form the fluid container portion and the neck portion, then fill the fluid container portion and then form the tip portion.

Figure 8:
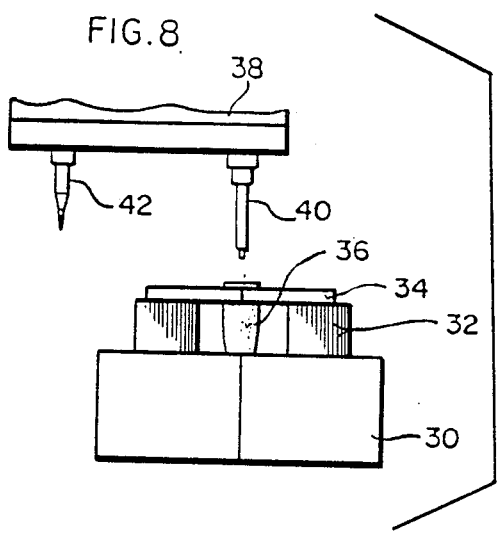
Figure 9:
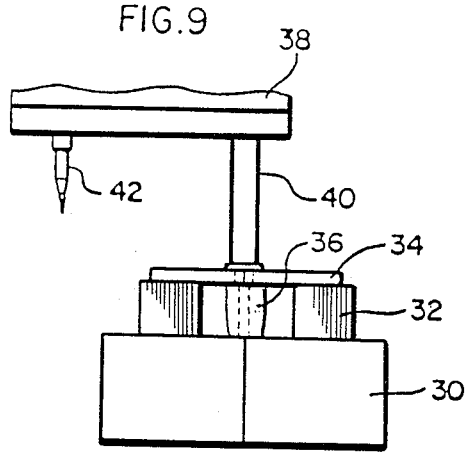

More particularly, as can be seen in FIG. 8, the mold 30 and its associated parts has moved under the composite head 38, with the mandrel 40 disposed over so as to enter the parison 36 which is supported by the holding jaw 34. In FIG. 9 the mandrel 40 is lowered into the parison 36 and, as can be best seen in FIG. 5, the diameter of the mandrel 40 is slightly less than the interior diameter of the neck portion 14 of the container 10 so that it does not press against or engage the parison 36. In this instance, the fluid container portion 12 and the neck portion 14 of the container 10 are formed by vacuum, as opposed to being blown, however they could be blown if desired. As indicated above, the fluid container portion 12 then is filled with fluid.

Figure 10:
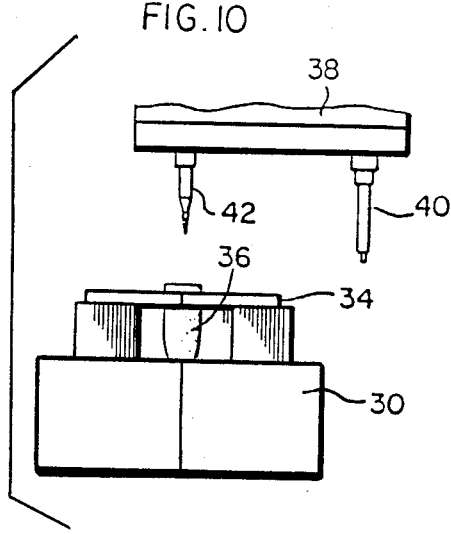
Figure 11:
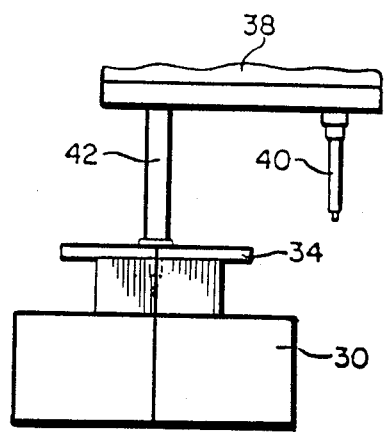

After the fluid is injected, the mandrel 40 is retracted and the composite head 38 is shuttled (to the right, as illustrated) so that the tip forming core 42 is disposed over so as to enter the parison 36, as illustrated in FIG. 10. The head jaw 32 then is closed, as illustrated in FIG. 11 to form the tip portion 16.

Figure 2:
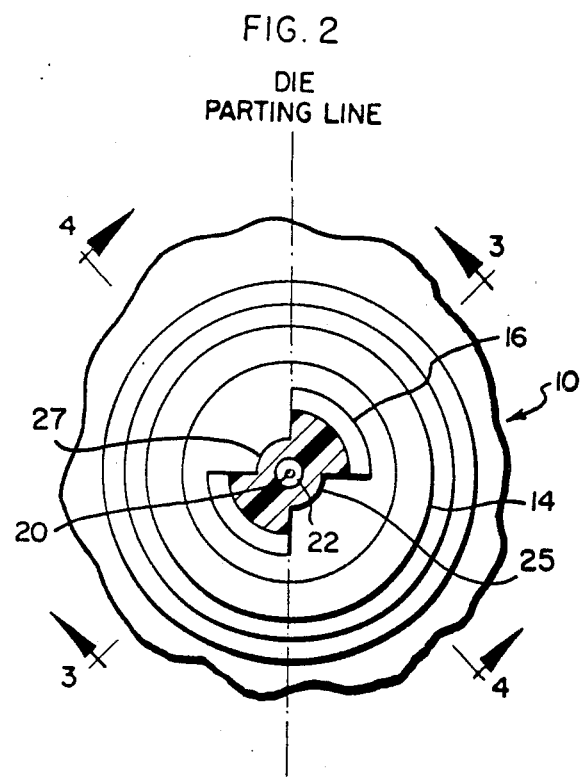
FIG. 2 is a partial sectional view taken along lines 2—2 of FIG. 1.

As can be best seen in FIG. 6, the open end of the parison 36 still is held by the holding jaw 34. The parison 36 is pressed against an enlarged diameter portion 44 of the tip forming core 42, and the portion of the parison 36 below this point to the tip of the tip portion 16 is held by vacuum via the vacuum ports 37 formed in the head jaw 32 in conventional fashion and by means well-known in the art against the head jaw 32 to provide an air space 46 between the parison and the tip forming core 42. The air space 46 reduces the tendency of the tip forming core 42 to overheat, for it is desired that the tip portion 16 set up as quickly as possible and that the tapered tip 48 and pin 50 of the tip forming core 42 stay as cool as possible to prevent the orifice 20 from closing when the tip forming core 42 is retracted. The enlarged diameter portion 44 is provided with venting grooves 52 to further assist in cooling the tip forming core 42. It may also be noted that the tip portion 16 is cored out, as at 21 and 23 (see FIGS. 1, 2 and 4) so as to reduce the amount of plastic about the orifices 20 and 22. In this respect, it is desirable to make the plastic in the areas 25 and 27 about these orifices as thin as is practically possible so that the plastic will cool rapidly. If the plastic does not cool rapidly, when the tip forming core 42 is extracted, the plastic may melt and close the orifice 20. The rapid cooling reduces shrinkage of the orifices 20 and 22. The pin 50 is disposed within a pin bore 51 which extends through the length of the tip forming core 42 and is removably disposed therein by means of a retaining means so that the pin 50 is easily replaceable in the event of damage. In molding the droplet dispenser bottle 10, the molding cycle is controlled by the control means 41 which may be of the type well-known in the art to permit the tip forming core 42 to cool between cycles, so that it is not overheated. In molding the droplet dispenser bottle 10, it is found that a molding cycle of 11 seconds per cycle is about the minimum cycle time at which the apparatus can be operated and form a satisfactory droplet dispenser bottle, without the necessity of providing elaborate means for properly cooling the tip forming core 42.

What is claimed is:

1. Apparatus for forming and filling a bottle in a single-blow-molded operation including:
   means for extruding a length of thermoplastic tubing;
   at least one sectional molding apparatus which is arranged to enclose said length of thermoplastic plastic tubing within said molding assembly to seal closed the lower end of said tubing and to form within said molding assembly a fluid container portion for said bottle;
   means for severing said length of thermoplastic tubing;
   holding jaw means for holding said severed length of thermoplastic tubing; and
   a fill tube for filling the fluid container portion of said bottle formed in said molding assembly;
   said molding assembly being movable beneath said fill tube and said fill tube being lowered into said severed length of thermoplastic tubing and a fluid being injected through said fill tube to fill said container portion; the improvement comprising a tip forming core which in combination with a head jaw means form a tip portion integrally with said fluid container portion so as to provide an integrally formed droplet dispenser bottle in a single blow-molded operation;
   said head jaw means being of a two-piece construction closeable about said severed length of thermoplastic tubing and having a mold cavity therein for forming a tip portion integrally with said fluid container portion;
   said tip forming core having on the end thereof a tapered portion which forms in conjunction with said head jaw means a cone-shaped orifice within said tip portion, and a cylinder pin portion at the end of said tappered portion which forms a conjunction with said head jaw portion a cylindrical orifice in fluid communication with said cone-shaped orifice and said fluid container portion, said tapered portion and said cylindrical pin portion being proportioned to form within said tip portion a cone-shaped orifice and a cylindrical orifice which will dispense a precisely controlled drop of fluid from said fluid container portion when a compressive force is applied to said fluid container portion.

2. Apparatus as claimed in claim 1, wherein said cylindrical pin portion is formed by a cylindrical pin extending through said tip forming core.

3. Apparatus as claimed in claim 2, wherein said cylindrical pin is removable from said tip forming core, and replaceable.

4. Apparatus as claimed in claim 1, wherein said mold cavity in said head jaw means has formed therein means for coring out said tip portion formed integrally with said fluid container portion of said bottle to reduce the amount of thermoplastic about said orifices formed therein, whereby the thermoplastic about said orifices will cool as rapidly as possible and will not melt and close said cylindrical orifice when the tip forming core is retracted from the head jaw means.

5. Apparatus as claimed in claim 4, further comprising an enlarged diameter portion on said tip forming core against which said severed length of thermoplastic tubing is pressed by said head jaw means, vacuum means for holding the portion of said severed length of thermoplastic tubing within said head jaw means and below said enlarged diameter portion to the tip of the tip portion in spaced apart relationship from said tip forming core to provide an air space between said tip forming core and said severed length of thermoplastic tubing to thereby reduce the tendency of said tip forming core from overheating.

6. Apparatus as claimed in claim 5, wherein said enlarged diameter portion of said tip forming core further is provided with venting grooves therein to further assist in cooling said tip forming core.

7. Apparatus as claimed in claim 1, further comprising a composite head supporting said fill tube and said tip forming core and being moveable to position the respective ones of said fill tube and tip forming core in position with said severed length of thermoplastic tubing to permit them to be lowered into said severed length of thermaplastic tubing.

8. A method of forming and filling a droplet dispenser bottle for dispensing therefrom controlled drops in a single blow-molded operation using at least one sectional molding apparatus which is arranged to enclose a length of thermoplastic plastic tubing within said molding apparatus to seal closed the lower end of said tubing and to form within said molding assembly a fluid container portion for said bottle comprising the steps of:
   extruding a length of thermoplastic tubing;
   severing said length of thermoplastic tubing which is disposed within said molding apparatus;
   holding said severed length of thermoplastic tubing by means of a holding jaw;
   filling the fluid container portion of said bottle formed in said molding assembly by means of a fill tube which is lowered into said severed length of thermoplastic tubing and injecting a fluid through said fill tube to fill said container portion; retracting said fill tube from said severed length of thermoplastic tubing;
   moving a tip forming core over said severed length of thermoplastic tubing;
   lowering said tip forming core into said severed length of thermoplastic tubing;
   closing a head jaw means which is of a two-piece construction about said severed length of thermoplastic tubing to form a tip portion integrally with said fluid container portion;
   forming by means of said tip forming core and said head jaw means a cone-shaped orifice and a cylindrical orifice that is in fluid communication with said cone-shaped orifice and said fluid container portion within said tip portion which are proportioned to dispense a precisely controlled drop of fluid from said fluid container portion when a compressive force is applied to said fluid container portion retracting said tip forming core from said tip portion of said fluid container.

9. The method of claim 8, further comprising the step of coring out said tip portion formed integrally with said fluid container portion of said bottle by means of said head jaw means to reduce the amount of thermoplastic about said orifices formed therein, whereby the thermoplastic about said orifices will cool as rapidly as possible and will not melt and close said cylindrical orifice when the tip forming core is retracted from the tip portion of said fluid container.

10. The method of claim 8, further comprising the steps of pressing said severed length of thermoplastic tubing against an enlarged diameter portion of said tip forming core, and holding by vacuum the portion of said severed length of thermoplastic tubing within said head jaw means and below said enlarged diameter portion to the tip of the tip portion in spaced apart relationship from said tip forming core to provide an air space between said tip forming core and said severed length of thermoplastic tubing to thereby reduce the tendency of said tip forming core from overheating.

11. The method of claim 10, further comprising the step of cooling said tip forming core by providing venting grooves in said enlarged diameter portion of said forming core.

12. The method of claim 8, further comprising the step of supporting said fill tube and said tip forming core by means of a composite head which is moveable to position the respective ones of said fill tube and tip forming core in position with said severed length of thermoplastic tubing to permit them to be lowered into it.

13. The method of claim 8, further comprising the step of controlling the molding cycle to permit said tip forming core to cool between cycles, whereby said tip forming core is not overheated.

* * * * *